(12) United States Patent
Duggirala et al.

(10) Patent No.: US 12,445,279 B2
(45) Date of Patent: Oct. 14, 2025

(54) SMART ROUND ROBIN DELIVERY FOR HARDWARE SECURITY MODULE HOST REQUESTS

(71) Applicant: INTERNATIONAL BUSINESS MACHINES CORPORATION, Armonk, NY (US)

(72) Inventors: Surya V. Duggirala, Eagan, MN (US); Richard Victor Kisley, Charlotte, NC (US); Mark Douglas Marik, Denver, NC (US); Michael Ordway Tingey, Jr., Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 611 days.

(21) Appl. No.: 17/806,515

(22) Filed: Jun. 13, 2022

(65) Prior Publication Data

US 2023/0403146 A1 Dec. 14, 2023

(51) Int. Cl.
*H04L 9/08* (2006.01)
*G06F 3/06* (2006.01)
*H04L 47/62* (2022.01)

(52) U.S. Cl.
CPC .......... *H04L 9/0877* (2013.01); *G06F 3/0622* (2013.01); *G06F 3/0656* (2013.01);
(Continued)

(58) Field of Classification Search
CPC . H04L 9/0877; H04L 9/0825; H04L 47/6225; H04L 9/08; G06F 3/0622; G06F 3/0656; G06F 3/067
See application file for complete search history.

(56) References Cited

U.S. PATENT DOCUMENTS 5,299,190 A 3/1994 LaMaire
6,633,568 B1 10/2003 Han
(Continued)

FOREIGN PATENT DOCUMENTS

CN 106533982 B 3/2017
CN 106921607 B 7/2017
(Continued)

OTHER PUBLICATIONS

Mell et al., "The NIST Definition of Cloud Computing," Recommendations of the National Institute of Standards and Technology, U.S. Department of Commerce, Special Publication 800-145, Sep. 2011, 7 pgs.

*Primary Examiner* — Robert B Leung
*Assistant Examiner* — Howard H. Louie
(74) *Attorney, Agent, or Firm* — Randy Tejeda

(57) ABSTRACT

A method, a computer program product, and a system are provided that handles host requests on a hardware security module (HSM). The method includes selecting a domain with a longest wait time with a host request for the HSM and selecting an oldest host request requested by the domain. The method also includes determining a hardware engine type required to process the oldest host request and determining a saturation level of the hardware engine type exceeds a saturation threshold. The method further includes selecting a second host request requested by the domain that uses a different hardware engine type based on the saturation level exceeding the saturation threshold and processing the second host request using the different hardware engine type of the HSM. The method further includes selecting unprocessed host requests of the domains to continuously provide efficient selection of those host requests to the HSM.

20 Claims, 6 Drawing Sheets

(52) U.S. Cl.
CPC ............ *G06F 3/067* (2013.01); *H04L 9/0825* (2013.01); *H04L 47/6225* (2013.01)

(56) References Cited

U.S. PATENT DOCUMENTS

| | | | |
|---|---|---|---|
| 7,580,355 | B2 | 8/2009 | Zhao |
| 8,363,668 | B2 | 1/2013 | Thomas |
| 8,943,236 | B1 | 1/2015 | Usmani |
| 9,042,398 | B2 | 5/2015 | Lee |
| 10,831,536 | B2 | 11/2020 | Hirsch |
| 2018/0075259 | A1* | 3/2018 | Manapragada ......... G06F 21/85 |
| 2018/0091311 | A1* | 3/2018 | Kisley ................... H04L 9/0897 |
| 2021/0409210 | A1* | 12/2021 | Krummel .............. H04L 9/3247 |

FOREIGN PATENT DOCUMENTS

| | | |
|---|---|---|
| CN | 104869079 B | 3/2018 |
| EP | 1111858 A2 | 6/2001 |

\* cited by examiner

SMART ROUND ROBIN DELIVERY FOR HARDWARE SECURITY MODULE HOST REQUESTS

BACKGROUND

The present disclosure relates to hardware security modules and, more specifically, to efficiently handling hardware security module requests using optimized round-robin delivery techniques.

A hardware security module (HSM) is a dedicated crypto processor designed for the protection of the crypto key life cycle. HSMs act as trust anchors that protect the cryptographic infrastructure of some of the most security-conscious organizations in the world by securely managing, processing, and storing cryptographic keys inside a hardened, tamper-resistant device. These modules traditionally come in the form of a plug-in card, an external device that attaches directly to a computer or network server, a network-attached HSM that takes the form of a standard HSM while also being communicatively linked to an appliance server, and a cloud-based HSM.

Cloud-Based Hardware Security Modules in which a cloud-based HSM provides the same core security functions of a physically controlled HSM, such as a USB HSM, while allowing user access within the cloud and from a user device, including user devices without input ports capable of direct connection to the HSM. The HSMs can be connected to multi-HSM appliances on the organization or user side of the cloud network or on the cloud provider side of the cloud network. Cloud HSMs can facilitate multiple users, and multi-HSM appliances can facilitate multiple organizations.

SUMMARY

Embodiments of the present disclosure include a method that handles the processing of host requests on a hardware security module. The method includes selecting a domain with the longest wait time with a host request to the HSM and, within the oldest domain, selecting an oldest host request requested by the first domain. The method also includes determining a hardware engine type in the HSM required to process the oldest host request and determining a saturation level of the hardware engine type, that may exceed a saturation threshold. The saturation level indicates a usage of the hardware engine type and if a hardware engine of that type is available. The method further includes selecting a second host request requested by the oldest domain that uses a different hardware engine based on the saturation level exceeding the saturation level and processing the second host request, instead of the first host request, using the different hardware engine type of the HSM. The second host request is selected over the first host request in the oldest domain only if the first host request's engine type is saturated. The method also includes selecting a third host request requested by the oldest domain that uses a hardware engine different than what was needed by the first and second request based on the saturation level exceeding the saturation threshold and processing the third host request using the different hardware engine type of the HSM. The third host request is selected over the first and second host request in the oldest domain only if both the first and second host request's engine type is saturated. This selection process can be repeated for N host requests in a domain when the first to $(N-1)^{th}$ host requests require different hardware engines that are saturated. The selection process can end when there are either no more host requests to examine, or if all engine types in the HSM have been checked for saturation. If all N host request's engine types are saturated, then the oldest host request is selected for processing by the HSM application.

Additional embodiments of the present disclosure include a computer program product method that handles processing of host requests on a hardware security module, a computer-readable storage medium having computer-readable instructions stored therein, wherein the computer-readable instructions, when executed on a computing device, cause the computing device to select a domain with the longest wait time with a host request to the HSM and, within the oldest domain, select an oldest host request requested by the first domain. The computer program product also includes instructions that cause the device to determine a hardware engine type in the HSM required to process the oldest host request and determining a saturation level of the hardware engine type, that may exceed a saturation threshold. The saturation level indicates a usage of the hardware engine type and if a hardware engine of that type is available. The computer program product also includes instructions that cause the device to select a second host request requested by the oldest domain that uses a different hardware engine based on the saturation level exceeding the saturation level and process the second host request, instead of the first host request, using the different hardware engine type of the HSM. The second host request is selected over the first host request in the oldest domain only if the first host request's engine type is saturated. The computer program product also includes instructions that cause the device to select a third host request requested by the oldest domain that uses a hardware engine different than what was needed by the first and second request based on the saturation level exceeding the saturation threshold and process the third host request using the different hardware engine type of the HSM. The third host request is selected over the first and second host request in the oldest domain only if both the first and second host request's engine type is saturated. This selection process can be repeated for N host requests in a domain when the first to $(N-1)^{th}$ host requests require different hardware engines that are saturated. The selection process can end when there are either no more host requests to examine, or if all engine types in the HSM have been checked for saturation. If all N host request's engine types are saturated, then the oldest host request is selected for processing by the HSM application.

Further embodiments of the present disclosure include an apparatus that handles processing of host requests on a hardware security module. The apparatus includes a memory, a processor, local data storage having stored thereon computer-executable code. The computer-executable code includes the program instruction executable by a processor to cause the processor to perform the method described above. The present summary is not intended to illustrate each aspect of, every implementation of, and/or every embodiment of the present disclosure.

BRIEF DESCRIPTION OF THE DRAWINGS

These and other features, aspects, and advantages of the embodiments of the disclosure will become better understood with regard to the following description, appended claims, and accompanying drawings where:

Figure 1:
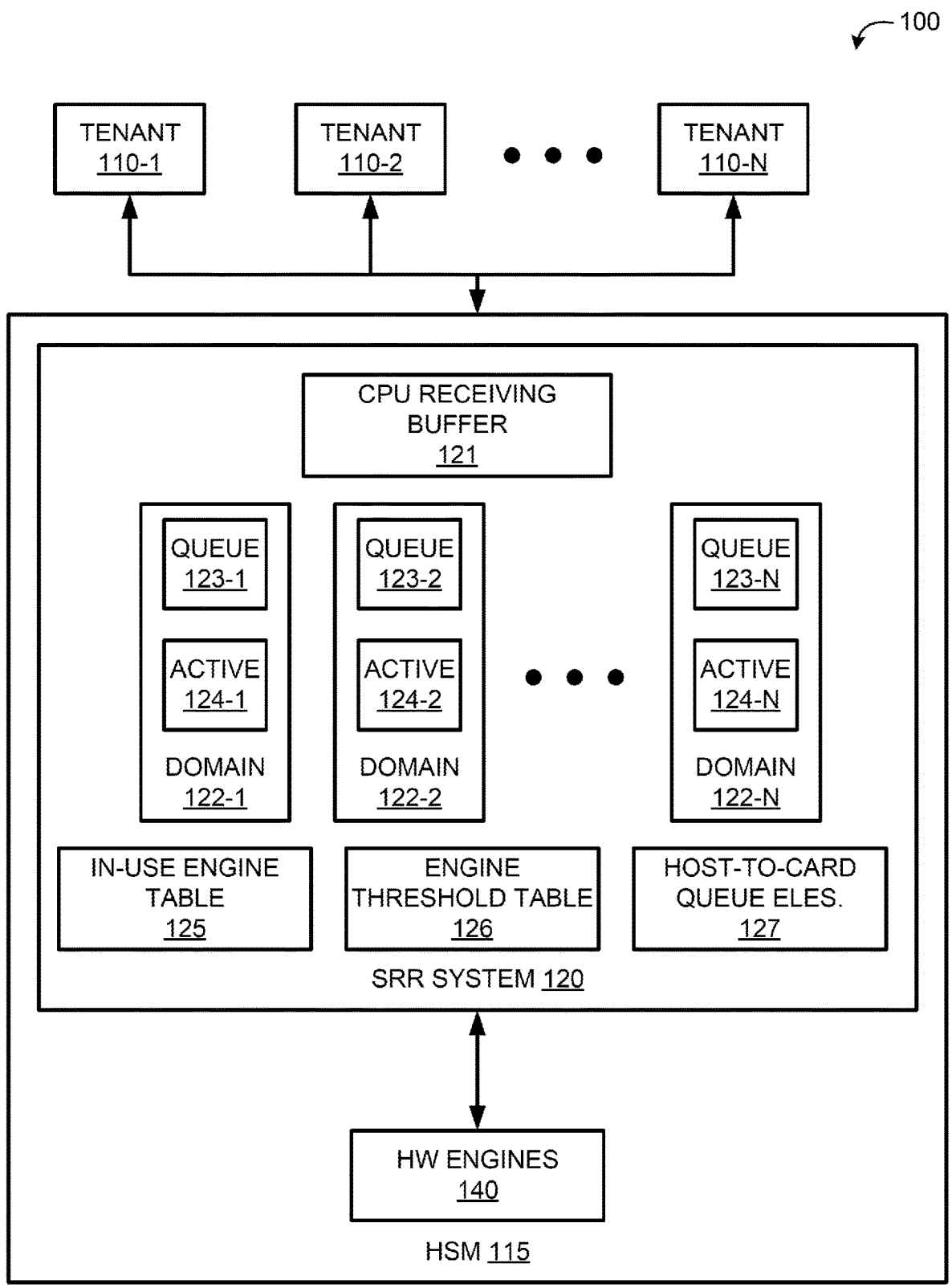
FIG. 1 is a block diagram illustrating an operation of the primary operational elements of a hardware security module for handling host requests from multiple tenants and used by one or more embodiments of the present disclosure.

While the present disclosure is amenable to various modifications and alternative forms, specifics thereof, have been shown by way of example in the drawings and will be described in detail. It should be understood, however, that the intention is not to limit the particular embodiments described. On the contrary, the intention is to cover all modifications, equivalents, and alternatives falling within the scope of the present disclosure. Like reference numerals are used to designate like parts in the accompanying drawings.

DETAILED DESCRIPTION

The present disclosure relates to hardware security modules and, more specifically, to efficiently handle hardware security module requests using optimized round-robin delivery techniques. While the present disclosure is not necessarily limited to such applications, various aspects of the disclosure may be appreciated through a discussion of various examples using this context.

The move to digitization and communication over the Internet is leading to pervasive use of cryptography for daily tasks. The need for cryptographic operations is even more pronounced in critical ecosystems such as financial and governmental ones. In these contexts, it is often mandatory to use special machines called Hardware Security Modules (HSMs) that allow applications to perform critical operations internally without exposing the cryptographic keys. The main feature of an HSM is to keep sensitive data inside tamper-resistant hardware so that in the event of a physical attack, it is not possible to extract the cryptographic keys and produce an identical copy of the HSM for malicious purposes. In other words, resistance to intrusion makes an HSM unique, similar to a smartcard: an attacker who wants to carry out illicit cryptographic operations should necessarily have access to the device since its cloning requires a copy of the secret data kept in the device, should not be possible.

In recent years, cloud HSMs have become more prevalent and widely used. Several cloud service providers give the possibility to use real HSM clusters managed entirely in the cloud and accessible via remote Application Programming Interfaces (APIs). With classic, physically reachable HSMs, it was possible to use specific procedures for managing keys, which could only be performed by users with physical access to the machines. With cloud HSMs, however, these procedures take place remotely via the API offered by the service provider.

Typically, HSMs are designed to manage secret keys. Many HSM systems have the means to securely back up the keys they handle outside of the HSM. Keys may be backed up in wrapped form and stored on a computer disk or other media or externally using a secure portable device like a smartcard or some other security token. Additionally, HSMs can be used for real-time authorization and authentication in critical infrastructure, and thus they are typically engineered to support standard high availability models, including clustering, automated failover, and redundant field-replaceable components.

Functionally, HSMs can be employed in any application that uses digital keys. Additional functions of an HSM include, but are not limited to, onboard secure cryptographic key generation, onboard secure cryptographic key storage, at least for the top-level and most sensitive keys (i.e., master keys), key management, use of cryptographic and sensitive data material, for example, performing encryption or digital signature functions, and offloading application servers for complete asymmetric and symmetric cryptography.

HSMs are also deployed to manage transparent data encryption keys for databases and keys for storage devices such as disks or tape. HSMs can also provide both logical and physical protection of these materials, including cryptographic keys, from disclosure, non-authorized use, and potential adversaries. HSMs support both symmetric and asymmetric (public key) cryptography. For some applications, such as certificate authorities and digital signing, the cryptographic material is asymmetric key pairs (and certificates) used in public-key cryptography. With other applications, such as data encryption or financial payment systems, the cryptographic material consists mainly of symmetric keys.

Limitations on processing requests on an HSM remain, however, as requests are handled using a regular round-robin selection process or via a first come first serve process. For instance, requests can be sent from multiple tenants to a cloud HSM. Those requests are typically handled using either a system-wide first come first serve (FCFS) or regular round-robin (RRR) method. The FCFS uses the oldest host-to-card data queue element to retrieve the host-to-card data packet that is to be delivered to the tenant application for processing. The FCFS method does not consider the domain (i.e., the tenant) or the crypto-type of the host request block (HRB). The RRR method pulls the oldest host-to-card queue element from each domain in a simple round-robin fashion and is delivered to the tenant application for processing. However, the RRR also does not consider the crypto-type of the host request block.

Embodiments of the present disclosure may overcome the above, and other problems, by providing a smart round robin (SRR) system and method of handling host requests on a hardware security module (HSM). The SRR system provides a two-stage round-robin technique for the selection of a host request from a given domain to be delivered to a tenant application for processing. The SRR system can cycle through the domain of each tenant when selecting a host request to process while also tracking hardware engine saturation of the HSM performing the operation.

More specifically, the SRR system provides a two-stage round-robin technique for the selection of host requests from a given domain to be delivered to a tenant application for processing. Domain queue elements that have host requests requiring processing can be selected systematically in a round-robin fashion. This can be considered the first stage of the process. Each domain queue element selected in the first stage can maintain queues for the cryptographic-type (crypto-type) those elements require for their requests. For example, these queues for crypto-types can include Rivest-Shamir-Adleman (RSA) operations, Elliptic-curve cryptography (ECC), Symmetric Key Cipher Hash (SKCH) operations, other encryption (OTHER) types, and a FCFS queue for that domain. Additional functions such as random number generation (RNG) can also be implemented and while RNG is not necessarily an encryption type, it is a function that can require a hardware engine in some embodiments. Since RNG is utilized by multiple encryption types, it can be considered in the OTHER category.

There are multiple purposes for the FCFS queue in the domain ring queue elements. One purpose of the FCFS queue for each domain is to maintain the order of reception in which the RSA, ECC, SKCH, and OTHER requests arrive for that domain. If all crypto-type engines in the HSM become totally saturated with work, the oldest host-to-card queue element in the FCFS list head for that domain is used for delivery of the associated CPU request buffer to the tenant application for processing. Another purpose of the FCFS queue in each domain is that the oldest host-to-card queue element in the domain ring queue element's FCFS queue can be examined to determine its crypto-type. This crypto-type can be compared against the saturation level of the HSM's engines at that moment. The SRR system can use knowledge about the current RSA, ECC, SKCH, and OTHER engine saturation levels in the adapter to select which host-to-card queue element to pull from one of the domain's crypto-type queues (RSA, ECC, SKCH, or OTHER). The SRR system can start with the crypto type of the oldest host-to-card queue element on the FCFS queue on that domain.

In some embodiments, the oldest crypto-type request in the host-to-card queue element's FCFS queue is used as an index into a system's in-use engine table and a system engine threshold table. The values of the system engine in use table are compared against the count in the system engine threshold table for the crypto-type being requested. If the value is below the threshold for that crypto-type, then the host-to-card queue element is removed from both the domain queue element's FCFS queue and the crypto-type queue. Additionally, the system engine in use count is incremented by one for that crypto-type value in the system engine in-use table. Else, if the value greater than or equal to the threshold for the crypto-type, then a systematic second level round-robin operation is performed comparing engine-in-use versus the engine threshold for the remaining crypto-type queues which have host-to-card queue element content until a host-to-card queue element is selected from a crypto-type queue whose engine's in-use count is less than the system engine threshold count. If no crypto-type selection can be found to meet the comparison criteria, then the oldest host-to-card queue element from the domain's FCFS queue is selected, which in turn is used to locate the host to card data packet for delivery to the tenant application.

In some embodiments, the SRR system avoids starvation of the HSM or delay of processing requests by not skipping a domain when it is that domain's turn to have a host request processed. If the selected host-to-card queue element was from a crypto-type queue other than the crypto-type of the oldest FCFS queue element for that domain, then the oldest host-to-card queue element on the FCFS queue will be marked with a "skipped" flag. As a result, the next time this domain has its turn to have a host request processed, the "skipped" flag on the FCFS queue for that domain will be examined. If set, the host-to-card queue element will be removed from the domain's FCFS queue and the Crypto-Type queue regardless of the system engine in use count. This can prevent starvation of a host-to-card queue element on the FCFS queue that could happen when skipped repeatedly during periods of heavy workloads and high domain usage.

FIG. 1 is a block diagram illustrating a computing environment 100 for handling host requests from multiple tenants to a hardware security module, in accordance with embodiments of the present disclosure. The computing environment 100 includes tenants 110-1, 110-2, and 110-N (collectively "tenants 110"), where N is a variable integer representing any number of possible tenants 110 and a hardware security module (HSM) 115. The HSM 115 includes a smart round robin (SRR) system 120, and hardware engines 140. The SSR system 120 includes a central processing unit (CPU) receiving buffer (CRB) 121, domains 122-1, 122-2, 122-N (collectively "domains 122"), where N is a variable integer representing any number of possible domains 122 corresponding to the tenants 110, a system in-use engine table 125, a system engine threshold table 126, and host-to-card queue elements 127. For purposes of the present description, it will be assumed that the illustrative embodiments are being implemented as part of a virtualization mechanism and specifically on a service provider computing system utilizing a cloud hardware security module to process host requests. However, this is only one possible implementation and is not intended to be limiting to the present disclosure. Other implementations in which virtual machines and/or containers are utilized may also be used without departing from the spirit and scope of the present disclosure.

The tenants 110 are entities of the computing environment 100 granted access to the HSM 115. The tenants 110 can also be a group of users who share a common access with specific privileges to the HSM 115. The tenants 110 can participate in a multitenant architecture designed to provide every tenant 110 a dedicated share of the HSM 115, including data processing, configuration, user management, individual tenant functionality, and non-functional properties. The tenants 110 can also operate on a multi-instance architecture, where separate instances of the HSM 115 operate on behalf of the different tenants 110.

The HSM 115 is a component of the computing environment 100 configured to handle cryptographic operation requests from the tenants 110. The hardware engines 140, shared across all domains, can be employed in any application that uses digital keys. Additional functions of the HSM 115 include, but are not limited to, onboard secure cryptographic key generation, onboard secure cryptographic key storage, at least for the top-level and most sensitive keys (i.e., master keys), key management, use of cryptographic and sensitive data material, for example, performing encryption or digital signature functions, and offloading application servers for complete asymmetric and symmetric cryptography.

The SRR system 120 is a component of the HSM 115 configured to handle host requests from the tenants 110 to the HSM 115. The SRR system 120 provides mechanisms that process hosts requests from the tenants 110 that take into consideration the requests that have been queued for processing the longest, the crypto-type of the host request, and the saturation level of the hardware engine required to process the crypto-type.

The domains 122 are components of the SRR system 120 configured to correspond to the tenants 110 with access to the hardware engines 140. The domains 122 can be used as numeric identifiers that can be attached to the host requests made by the tenants 110 to the HSM 115. The numeric identifiers can be used to identify the tenant making the request. The domains 122 include domain queue elements 123-1, 123-2, 123-N (collectively "domain queue elements 123"), where N is a variable integer representing any number of possible domain queue elements 123 corresponding to their respective domains 122, and smart round-robin active counter arrays 124-1, 124-2, 124-N (collectively "SRR active counter arrays 124"), where N is a variable integer representing any number of possible SRR active counter arrays 124 corresponding to their respective domains 122.

The domain queue elements 123 are data structures of the SRR system 120 configured to track host request blocks provided to a domain 122 from a tenant 110. A domain's 122 workload is tracked through the domain queue element 123, with each domain 122 being assigned a domain queue element 123. Each of the domain queue elements 123 is either considered "free" where no host request blocks are present for their respective domains 122 or "active" when pending host request blocks are present for their respective domain 122.

In some embodiments, the domain queue elements 123 include fields such as a real domain, active counter, engine in-use pointer, engine threshold pointer, and an active counters pointer. The real domain field can include the domain 122 identifiers that the domain queue element 123 is associated with. The active counter can be an array of unsigned integers representing the number of host request blocks present in the SRR system 120 for the domain 122 that are actively being processed for each crypto-type. The engine in-use pointer can be a pointer to the system-wide system in-use engine table 125. The engine threshold pointer can be a pointer to the system-wide system engine threshold table 126. The active counters pointer can be a pointer to a dedicated SRR active counter array of linked lists that specifically track each host request block in the CRB 121 pertaining to that domain 122.

Additionally, each SRR active counter array includes an index that has a list head pointer that points to a linked list of host-to-card queue elements. Each host-to-card queue elements are present in two lists. They can appear in a hardware engine list and in an FCFS list.

The system in-use engine table 125 is a component of the SRR system 120 configured to store a count of the engines in use and perform an operation for a request. For example, tenant 110-1 transmits an ECC request. The SRR system 120 can provide that host request to the hardware engines 140 that can task an ECC engine to perform the operation. Upon operation, the system in-use engine table 125 can increment a counter for the ECC engine by one. Thus, when another ECC request is received, that counter can be compared to the engine threshold to determine whether that request can be immediately processed.

The system engine threshold table 126 is a component of the SRR system 120 configured to provide a threshold count for each crypto type provided by the hardware engines 140. The thresholds for each crypto type can correspond to the number of engines of a crypto type on the hardware engines 140. For example, the hardware engines 140 may have five SKCH engines that can process host requests. Thus, the threshold count for that crypto type in the system engine threshold table 126 would be five. It should be noted, however, that different threshold numbers can be used.

The host-to-card queue elements 127 are components of the SRR system 120 configured to track the host request blocks as they are received from the tenants 110. The host-to-card queue elements 127 can include, for each Host Request Block (HRB), pointers to the system FCFS list and to the system crypto type list that the HRB is associated with. In order to track the HRBs, the host-to-card queue elements 127 also maintains pointers to the HRBs stored in the CRB 121. A crypto-type list is also maintained that can be in the form of an enumeration that designates the type of hardware engine that the HRB will primarily use. Additionally, a skip counter is also maintained that tracks how many times the HRB has been skipped over by the SRR phase two processing. The skip counter can be used to prevent starvation of the hardware engines 140.

The hardware engines 140 are components of the HSM 115 that provide various cryptographic functionalities. The hardware engines 140 can include several different cryptographic engine types such as ECC engines, SKCH engines, and RSA engines. In some embodiments, the hardware engines 140 comprise a plurality of hardware ports, each one configured or reconfigurable to receive input (e.g., public data, public key, etc.) thereon to execute a designated cryptographic process within the hardware engines 140 in servicing a particular computational process, application or function.

In general, received input data will be port-specific in that only input cryptographic data specific to the port on which it is received can be successfully processed. To do so, each hardware port will generally have defined in association therewith a corresponding hardware link or channel (e.g., static and/or reconfigurable hardware link, channel, and/or switch) to a segregated hardware storage media that stores secured port-specific cryptographic data thereon exclusively retrievable for processing as a function of received input data specific to that hardware port.

For example, distinct embedded storage resources may be provided with respective hardware data links to their corresponding port, as can distinct storage partitions and/or zones are defined within the same embedded memory storage resource and accessed via dedicated hardware logic or the like. Namely, distinct embedded storage spaces or resources may encompass a physically segregated, separated, and/or defined hardware storage space on one or more hardware storage devices (i.e., memory board, chip, component, etc.) that is physically paired, allocated, and/or associated with a given port-specific cryptographic process.

Each storage space may be designated or adapted to store one or more cryptographic keys and/or like cryptographic data usable in invoking and/or executing a given port-specific process. Accordingly, in some embodiments, dedicated memory space may define a secure keyspace for a given cryptographic process and/or encompass storage capacity for other types of cryptographic and/or other related data. The integrated cryptographic engine 140, executed by an embedded or hardware-linked processor, can then be invoked to internally process the retrieved secured cryptographic data, for instance, in conjunction with the input data, to produce an intended computation result.

It is noted that FIG. 1 is intended to depict the major representative components of a HSM 115. In some embodiments, however, individual components may have greater or lesser complexity than as represented in FIG. 1, components other than or in addition to those shown in FIG. 1 may be present, and the number, type, and configuration of such components may vary.

Figure 2:
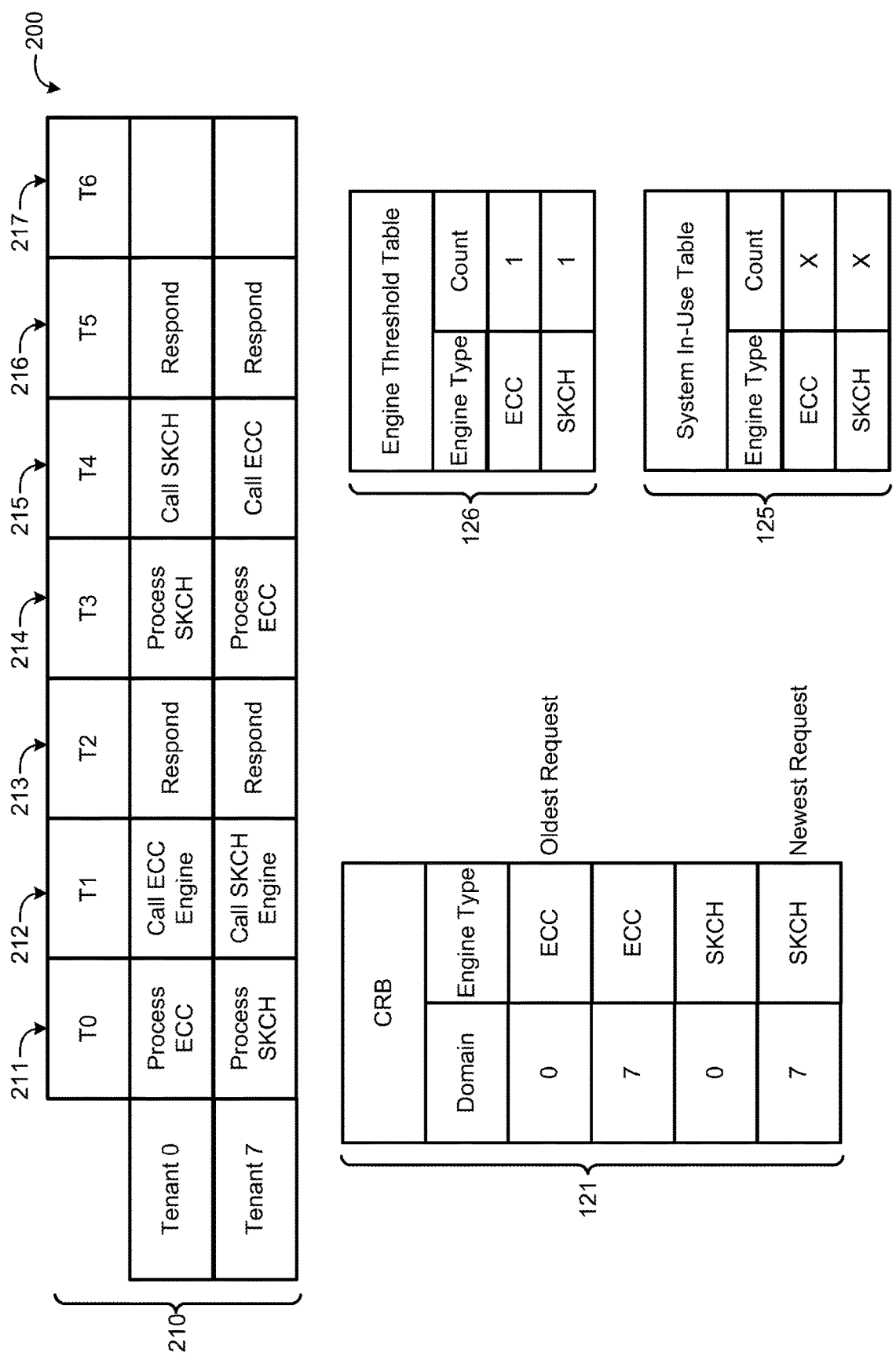
FIG. 2 is a block diagram illustrating a host request processing flow provided by a smart round-robin system and used by one or more embodiments of the present disclosure.

FIG. 2 is a block diagram illustrating a host request processing flow 200 of the SRR system 120, in accordance with embodiments of the present disclosure. The processing flow 200 illustrates a process table 210, a CRB 121, a system in-use engine table 125, and a system engine threshold table 126. For exemplary purposes only, processing flow 200 includes two tenants that are tenant 0 and tenant 7, with corresponding domains. Additionally, in this example, the HSM 115 has one ECC engine and one SKCH engine.

It should be appreciated, however, that embodiments allow more than two tenants to utilize the SRR system 120 and that the HSM 115 can be configured with more than two engine types with multiple engines of each type. Embodiments allow for multiple tenants utilizing the HSM 115 configured with various hardware engines of varying functions. Additionally, embodiments allow for any number of host requests made by the tenants 110 to be processed using the embodiments described herein.

The process 210 includes time frames T0 211, T1 212, T2 213, T3 214, T4 215, T5 216, and T6 217 that represent processing cycles of the HSM 115. Prior to receiving any host request blocks from the tenants, the CRB 121 is completely empty, allowing for the system in-use engines table 125 to initialize the engine types to '0'. As there are no host request blocks in the SRR system 120, the SRR active counters are empty, and the domain queue elements for domains 0 and 7 are listed in a "free" list with the active counter array values set to '0'.

As requests are received, prior to time T0 211, the CRB 121 is populated with those requests. In this example, and for illustrative purposes only, all four requests that are shown in the CRB 121 come into the system prior to time T0 211. In this processing flow 200 example, the following host requests are transmitted to the CRB 121 prior to time T0 in the following order: Tenant 0 transmits a request that primarily uses the ECC engine, Tenant 7 transmits a request that primarily uses the ECC engine, Tenant 0 transmits a request that primarily uses the SKCH engine, Tenant 7 transmits a request that primarily uses the SKCH engine When the first request from tenant 0 arrives, domain 0's domain queue element is removed from the "free" list and placed into the active domain list linked list at the oldest position as there are no other requests at that time. A determination is made as to the hardware engine required to primarily perform the request. Additionally, the active counter array values are incremented as domain 0 now has a request to process, such that domain 0's active ECC count is incremented and domain 0's FCFS count is incremented. Finally, the HSM communications device driver pulls a host-to-card queue element from the pool of queue elements 127 to track this HRB and adds the host-to-card queue element to both the FCFS queue and the crypto type queue (ECC in this instance) for domain 0.

When the second request from tenant 7 arrives, domain 7's domain queue element is removed from the "free" list and placed into the active domain linked list at the newest position, after domain 0's domain queue element, such that domain 0 is still listed as the "oldest" domain. A determination is made as to the hardware engine required to primarily perform the request. Additionally, the active counter array values are incremented as domain 7 now has a request to process, such that domain 7's ECC count is incremented and domain 7's FCFS count is incremented. Finally, the HSM communications driver pulls a host-to-card queue element from the pool of queue elements 127 to track the host request block and adds the host-to-card queue element to both the FCFS queue and the crypto type queue (ECC in this instance) for domain 7.

When the third request, from Tenant 0, arrives, domain 0's domain queue element is left untouched, as the domain queue element is already present on the active domain linked list. A determination is made as to the hardware engine required to primarily perform the request. Additionally, the active counter array values are incremented as domain 0 now has another request to process, such that domain 0's active SKCH count is incremented and domain 0's first-come-first serve count is incremented. Finally, the HSM communications device driver pulls a host-to-card queue element from the pool of queue elements 127 to track this HRB and adds the host-to-card queue element to both the FCFS queue and the crypto type queue (SKCH in this case) for domain 0.

When the fourth request, from Tenant 7, arrives, domain 7's domain queue element is left untouched, as the domain queue element is already present on the active domain linked list. A determination is made as to the hardware engine required to primarily perform the request. Additionally, the active counter array values are incremented as domain 7 now has another request to process, such that domain 7's active SKCH count is incremented and domain 7's first-come-first serve count is incremented. Finally, the HSM communications device driver pulls a host-to-card queue element from the pool of queue elements 127 to track this HRB and adds the host-to-card queue element to both the FCFS queue and the crypto type queue (SKCH in this case) for domain 7.

At time T0 211, the SRR system 120 begins the two-stage round-robin process by selecting the domain with the oldest host request block known as phase one. This can be accomplished by examining the active domain list that is pointing to domain 0. For Phase 2 of SRR-processing, a search begins for the HRB to return to the application for processing. Beginning with the oldest host request block in the domain, the engine type saturation level is checked by comparing the engine type of the host request block to the same engine type in the engine threshold table 126 and the engine in-use table 125. In this instance, the ECC engine in-use count is 0 as no other work is being performed by the HSM 115. Thus, the ECC request made by domain 0 can be processed by the HSM 115 at time t1 212. Domain 0's active counter array value can be updated, such that its ECC request is removed from the CRB 121 and given to the tenant application for processing. The host request block can also be removed from domain 0's internal FCFS and ECC lists that it maintains. Since the ECC engine is now in use, the system in-use table 125 can be updated by incrementing the ECC entry by one. Finally, domain 0's domain queue element is pulled off of the active list and, since its active counter array values indicate it still has unprocessed host requests, it is re-added to the active domain list, at the newest position, such that domain 7 is now the oldest domain on the active domain list.

While still being at time T0 211, the SRR system 120 performs another two-stage round-robin process on another processor (CPU) by again selecting the domain with the oldest host request block. This time, domain 7 is selected by the SRR system 120. For Phase 2 of SRR-processing, a search begins for the HRB to return to the application for processing. Beginning with the oldest host request block in the domain, the engine type saturation level is checked by comparing the engine type of the host request block to the same engine type in the engine threshold table 126 and the engine in-use table 125. In this instance, the ECC request cannot be performed as the ECC engine type of the HSM 115 is currently saturated since the engine threshold table 126 indicates the ECC threshold is '1' and the in-use table 125 indicates that '1' ECC engine is in use (currently being used by the host request of domain 0). Since the ECC request cannot be performed, the system host-to-card queue element's skip count is incremented, and the next oldest host request of domain 7 is examined. The SKCH request is selected, and it is determined that the saturation level of the SKCH engine type is not saturated, and therefore the host request can be processed by the HSM 115 at time t1 212. Domain 7's active counter array value can be updated, such that its SKCH request is removed from the CRB 121 and given to the tenant application for processing. The host request block can also be removed from domain 7's internal FCFS and SKCH lists that it maintains. Since the SKCH engine is now in use, the system in-use table 125 can be updated by incrementing the SKCH entry by one. Finally, domain 7's domain queue element is pulled off of the active list and, since its active counter array values indicate it still has unprocessed host requests, it is re-added to the active domain list, at the newest position, such that domain 0 is now the oldest domain on the active domain list.

At time t2 213, the HSM 115 has completed the ECC operation and the SKCH operation for domains 0 and 7, respectively, and has responded back to the tenant applications. Once completed, the system in-use table 125 can be updated by decrementing the ECC and SKCH entries by one.

At time T3 214, the SRR system 120 begins the two-stage round-robin process again by selecting the domain with the oldest host request block known (domain 0). For Phase 2 of SRR-processing, a search begins for the HRB to return to the application for processing. Beginning with the oldest host request block in the domain, the engine type saturation level is checked by comparing the engine type of the host request block to the same engine type in the engine threshold table 126 and the engine in-use table 125. In this instance, the SKCH engine in-use count is 0 as no other work is being performed by the HSM 115. Thus, the SKCH request for domain 0 can be processed by the HSM 115 at time t4 215. Domain 0's active counter array value can be updated, such that its SKCH request is removed from the CRB 121 and given to the tenant application for processing. The host request block can also be removed from domain 0's internal FCFS and SKCH lists that it maintains. Since the SKCH engine is now in use, the system in-use table 125 can be updated by incrementing the SKCH entry by one. Finally, domain 0's domain queue element is pulled off of the active list and, since its active counter array values indicate it has no unprocessed host requests, it is re-added to the free domain list, indicating it will not be searched again in the next round of Phase 1 processing by the SRR system 120.

While still being at time T3 214, the SRR system 120 performs another two-stage round-robin process using another processor by again selecting the domain with the oldest host request block. This time, domain 7 is selected by the SRR system 120. In phase two, the oldest host request block is examined in domain 7's active counter 124. The SRR system notices that the "skip count" for its host-to-card queue element is not 0, and this host request is the one immediately selected for application processing. Domain 7's active counter array values can be updated, such that its ECC request is removed from the CRB 121 and given to the tenant application for processing. The host request block can also be removed from domain 7's internal FCFS and ECC lists that it maintains. Since the ECC engine is now in use, the system in-use table 125 can be updated by incrementing the ECC entry by one. Finally, domain 7's domain queue element is pulled off of the active list and, since its active counter array values indicate it has no unprocessed host requests, it is re-added to the free domain list, indicating it will not be searched again in the next round of Phase 1 processing by the SRR system 120.

At time T5 216, the HSM 115 has completed the SKCH operation and the ECC operation for domains 0 and 7, respectively, and has responded back to the tenant applications. Once completed, the system in-use table 125 can be updated by decrementing the ECC and SKCH entries by one. At time t6 217, the CRB 121 is now empty, and no host requests are present.

Thus, the illustrative embodiments provide mechanisms for handling host requests from multiple tenants on a hardware security module. Embodiments extend traditional round-robin and first come first serve selection techniques to provide a balanced and efficient smart round-robin selection for host requests. When host requests are examined, an analysis is performed that first selects the oldest waiting host request and then examines the saturation level of the hardware engine type that is required to primarily process that host request. If the saturation level exceeds a saturation threshold, the SRR system 120 can select another host request that uses a different engine type. Moreover, the mechanisms of the illustrative embodiments may operate in conjunction with hypervisor systems and/or other virtualization computing systems to perform process computing between tenants 110 and the HSM 115 performing cryptographic operations.

As noted above, the systems and methods described herein also provide, in accordance with different embodiments, different examples in which a hardware security module is operable to concurrently service multiple applications and/or functions while optimizing system usage that may otherwise be slowed with traditional selection processes for a traditional HSM via an intermediary HSM access appliance, application layer or HSM access software.

Figure 3:
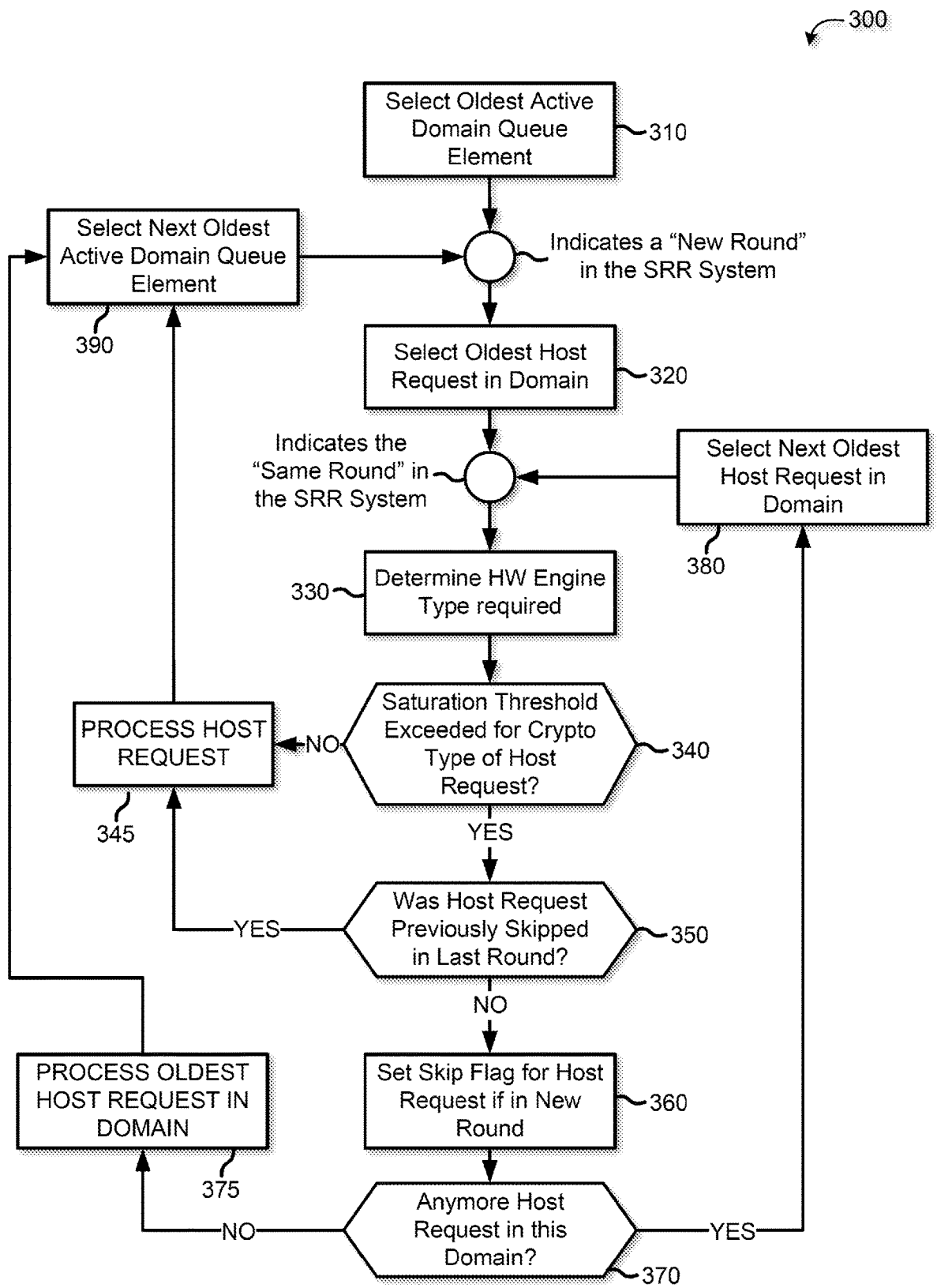
FIG. 3 is a flow diagram illustrating a process of handling host requests from multiple tenants to a hardware security module and performed in accordance with embodiments of the present disclosure.

FIG. 3 is a flow diagram illustrating a process 300 of handling and processing host requests on a hardware security module, in accordance with embodiments of the present disclosure. As shown in FIG. 3, the process 300 begins with the SRR system 120 selecting a domain with the oldest host request block by selecting the oldest active domain queue element from the active domain linked list maintained by the SRR system 120. This is illustrated at step 310. This can be accomplished by examining a list of domains that are listed as active, with the oldest domain at the front of the list, representing that it contains the oldest host request block.

From that selected domain, the SRR system 120 selects the oldest host request awaiting processing by the HSM 115. This is illustrated at step 320. The oldest request block can be retrieved by examining the FCFS queue 123 of the selected domain. Once selected, a determination is made as to the type of hardware engine primarily required to complete the host request. For example, the host request may require an ECC operation which would require an ECC engine from the HSM 115. This is illustrated at step 330. In some embodiments, the hardware engine type determination is made before Step 310 as that information is gathered when the host request block is queued.

A determination is made as to whether the saturation threshold of the hardware engine type is exceeded for the crypto type required by the host request. This is illustrated at step 340. The saturation level can be determined by comparing the engine count of the required engine type in the in-use engine table 125 with the same engine type in the engine threshold table 126. If the engine count is below the threshold, then the host request can be processed by the HSM 115. This is illustrated at step 345.

However, if the saturation level exceeds and/or meets the threshold, then a determination is made as to whether the host request was skipped in the last processing round due to hardware saturation. This is illustrated at step 350. The host-to-card queue element 127 tracking the host request maintains a skip counter that can be set, or flagged, when the host request is skipped over due to hardware saturation. Upon determining that the host request was previously skipped, the process 300 can proceed by processing the previously skipped host request to the HSM 115 as indicated by step 345. If set, the host-to-card queue element will be removed from the domain's FCFS queue and the crypto-type queue regardless of the system engine in use count. This can prevent starvation of a host-to-card queue element on the FCFS queue that could happen when skipped repeatedly during periods of heavy workloads and high domain usage.

However, if the host request was not previously skipped in a previous round, then process 300 can proceed to step 360 by incrementing the skip counter maintained in the host-to-card queue element for the host request. The skip counter is maintained to track how many times the host request has been skipped over by the SRR phase two processing. In some embodiments, the skip counter is set such that a host request can only be skipped over once. In some embodiments, the skip counter is set such that the host request is skipped multiple times while still preventing starvation of the HSM 115. In some embodiments, the skip counter is only analyzed during new rounds. If the process 300 is still in the same round of host request processing of a domain, then the skip counter is not analyzed.

As described herein, a new round is started when the oldest domain is selected and the oldest host request for that domain is analyzed. The same round is maintained for subsequent host requests that are analyzed for the original domain. A new round will occur once a new domain is selected for analysis. Additionally, in some embodiments, the domain with the longest wait time refers to the domain at a head of an active domain linked list maintaining domains with unprocessed requests.

A determination is made as to whether there are anymore host requests in the current domain ring queue element for that domain. This is illustrated at step 370. If another host request remains, then then a host request is selected from that domain. This is illustrated at step 380. The second host request can be analyzed in the same fashion as the first host request as demonstrated from step 330 onward. However, if no other host requests are currently in the host-to-card queue element, then the process 300 proceeds to step 375 by processing the oldest host request. This prevents the SRR system 120 from skipping a domain entirely. In some embodiments, at least one host request is processed regardless of whether its host requests are marked for skipping.

Once a host request is processed by the HSM 115 at either step 345 or step 375, the process 300 proceeds by selecting the next oldest active domain queue element to repeat the process 300 continuously as host requests are received from the tenants 110. This is illustrated at step 390.

In the present disclosure, the term "module" denotes a software component, a hardware component, or a combination thereof, and a module may be configured to perform a specific role or function. However, the term "module" is not limited to software or hardware. A module can be configured to be present in an addressable storage medium and configured to operate one or more processors. Consequently, examples of a module include components, such as software components, object-oriented software components, class components, and task components, processes, functions, attributes, procedures, subroutines, segments of program code, drivers, firmware, microcode, circuitry, data, databases, data structures, tables, arrays, and variables. Components and modules described herein may be combined into a smaller number of components and modules or subdivided into additional components and modules.

In the present disclosure, the term "security module" may denote a hardware component, a software component, or a combination thereof that performs an arbitrary security function, such as a key generation function for Internet of Things (IoT) device authentication, an encryption function, or a security monitoring function. When a hardware security module (HSM) is described in exemplary embodiments of the present disclosure, the HSM may denote a security module that is manufactured as a lightweight HSM which may be embedded in or coupled to an IoT device.

Figure 4:
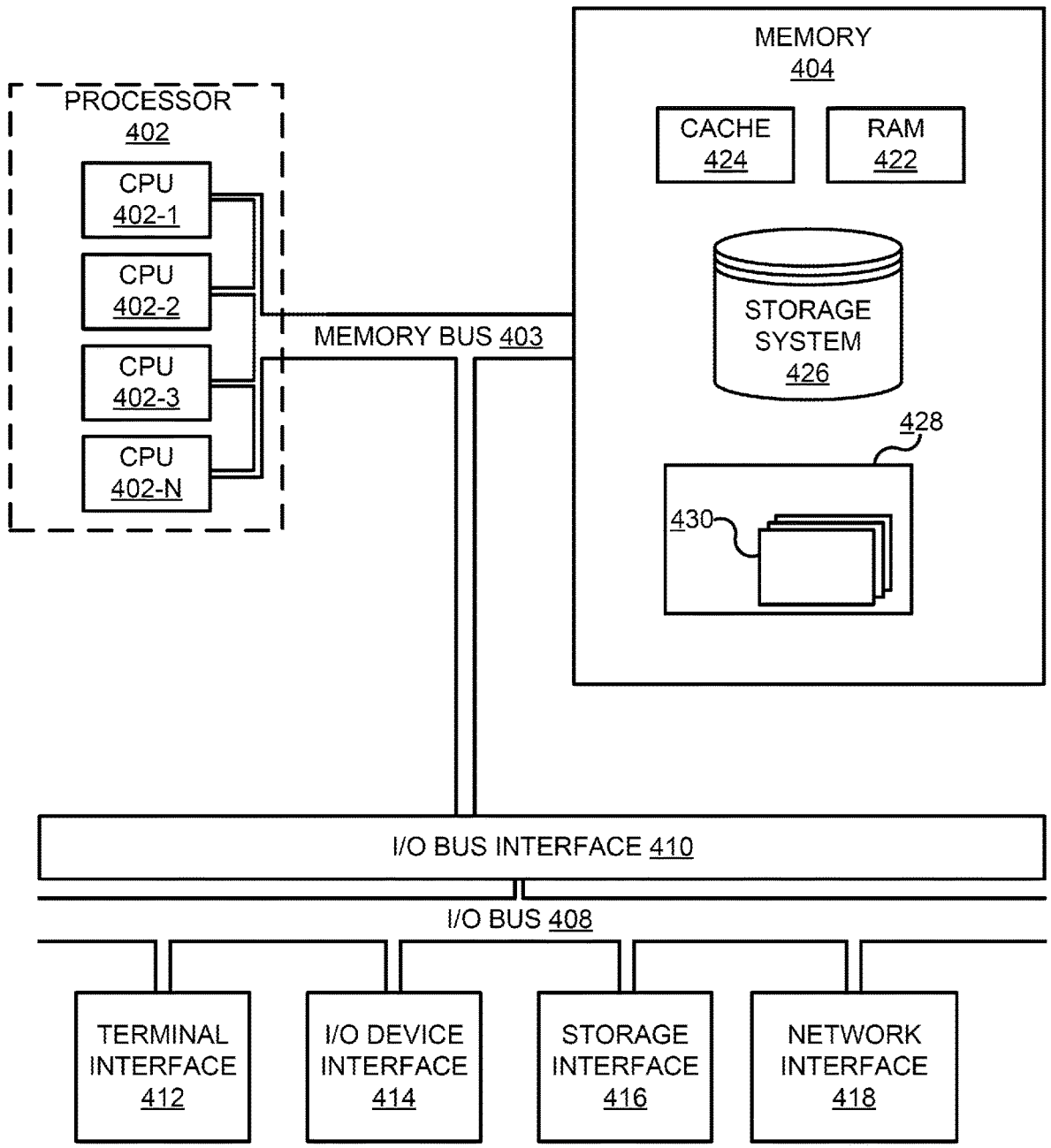
FIG. 4 is a high-level block diagram illustrating an example computer system that may be used in implementing one or more of the methods, tools, modules, and any related functions described herein in which the disclosure may be implemented.

Referring now to FIG. 4, shown is a high-level block diagram of an example computer system 400 (e.g., the SRR system 120) that may be used in implementing one or more of the methods, tools, and modules, and any related functions, described herein (e.g., using one or more processor circuits or computer processors of the computer), in accordance with embodiments of the present disclosure. In some embodiments, the major components of the computer system 400 may comprise one or more processors 402, a memory 404, a terminal interface 412, an I/O (Input/Output) device interface 414, a storage interface 416, and a network interface 418, all of which may be communicatively coupled, directly or indirectly, for inter-component communication via a memory bus 403, an I/O bus 408, and an I/O bus interface 410.

The computer system 400 may contain one or more general-purpose programmable central processing units (CPUs) 402-1, 402-2, 402-3, and 402-N, herein generically referred to as the processor 402 (e.g., graphics processing unit, physics processing unit, application-specific integrated circuit, field programmable gate array). In some embodiments, the computer system 400 may contain multiple processors typical of a relatively large system; however, in other embodiments, the computer system 400 may alternatively be a single CPU system. Each processor 402 may execute instructions stored in the memory 404 and may include one or more levels of onboard cache.

The memory 404 may include computer system readable media in the form of volatile memory, such as random-access memory (RAM) 422 (e.g., processing in memory) or cache memory 424. Computer system 400 may further include other removable/non-removable, volatile/non-volatile computer system storage media. By way of example only, storage system 426 can be provided for reading from and writing to a non-removable, non-volatile magnetic media, such as a "hard drive." Although not shown, a magnetic disk drive for reading from and writing to a removable, non-volatile magnetic disk (e.g., a "floppy disk"), or an optical disk drive for reading from or writing to a removable, non-volatile optical disc such as a CD-ROM, DVD-ROM or other optical media can be provided. In addition, the memory 404 can include flash memory, e.g., a flash memory stick drive or a flash drive. Memory devices can be connected to memory bus 403 by one or more data media interfaces. The memory 404 may include at least one program product having a set (e.g., at least one) of program modules that are configured to carry out the functions of various embodiments.

Although the memory bus 403 is shown in FIG. 4 as a single bus structure providing a direct communication path among the processors 402, the memory 404, and the I/O bus interface 410, the memory bus 403 may, in some embodiments, include multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 410 and the I/O bus 408 are shown as single respective units, the computer system 400 may, in some embodiments, contain multiple I/O bus interface units, multiple I/O buses, or both. Further, while multiple I/O interface units are shown, which separate the I/O bus 408 from various communications paths running to the various I/O devices, in other embodiments, some or all of the I/O devices may be connected directly to one or more system I/O buses.

In some embodiments, the computer system 400 may be a multi-user mainframe computer system, a single-user system, or a server computer or similar device that has little or no direct user interface but receives requests from other computer systems (clients). Further, in some embodiments, the computer system 400 may be implemented as a desktop computer, portable computer, laptop or notebook computer, tablet computer, pocket computer, telephone, smartphone, network switches or routers, or any other appropriate type of electronic device.

It is noted that FIG. 4 is intended to depict the major representative components of an exemplary computer system 400. In some embodiments, however, individual components may have greater or lesser complexity than as represented in FIG. 4, components other than or in addition to those shown in FIG. 4 may be present, and the number, type, and configuration of such components may vary.

One or more programs/utilities 428, each having at least one set of program modules 430 (e.g., the SRR system 120), may be stored in memory 404. The programs/utilities 428 may include a hypervisor (also referred to as a virtual machine monitor), one or more operating systems, one or more application programs, other program modules, and program data. Each of the operating systems, one or more application programs, other program modules, and program data or some combination thereof, may include an implementation of a networking environment. Programs 428 and/or program modules 430 generally perform the functions or methodologies of various embodiments.

It is to be understood that although this disclosure includes a detailed description on cloud computing, implementation of the teachings recited herein is not limited to a cloud computing environment. Rather, embodiments of the present disclosure are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multitenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service-oriented with a focus on statelessness, low coupling, modularity, and semantic interoperability. At the heart of cloud computing is an infrastructure that includes a network of interconnected neurons.

Figure 5:
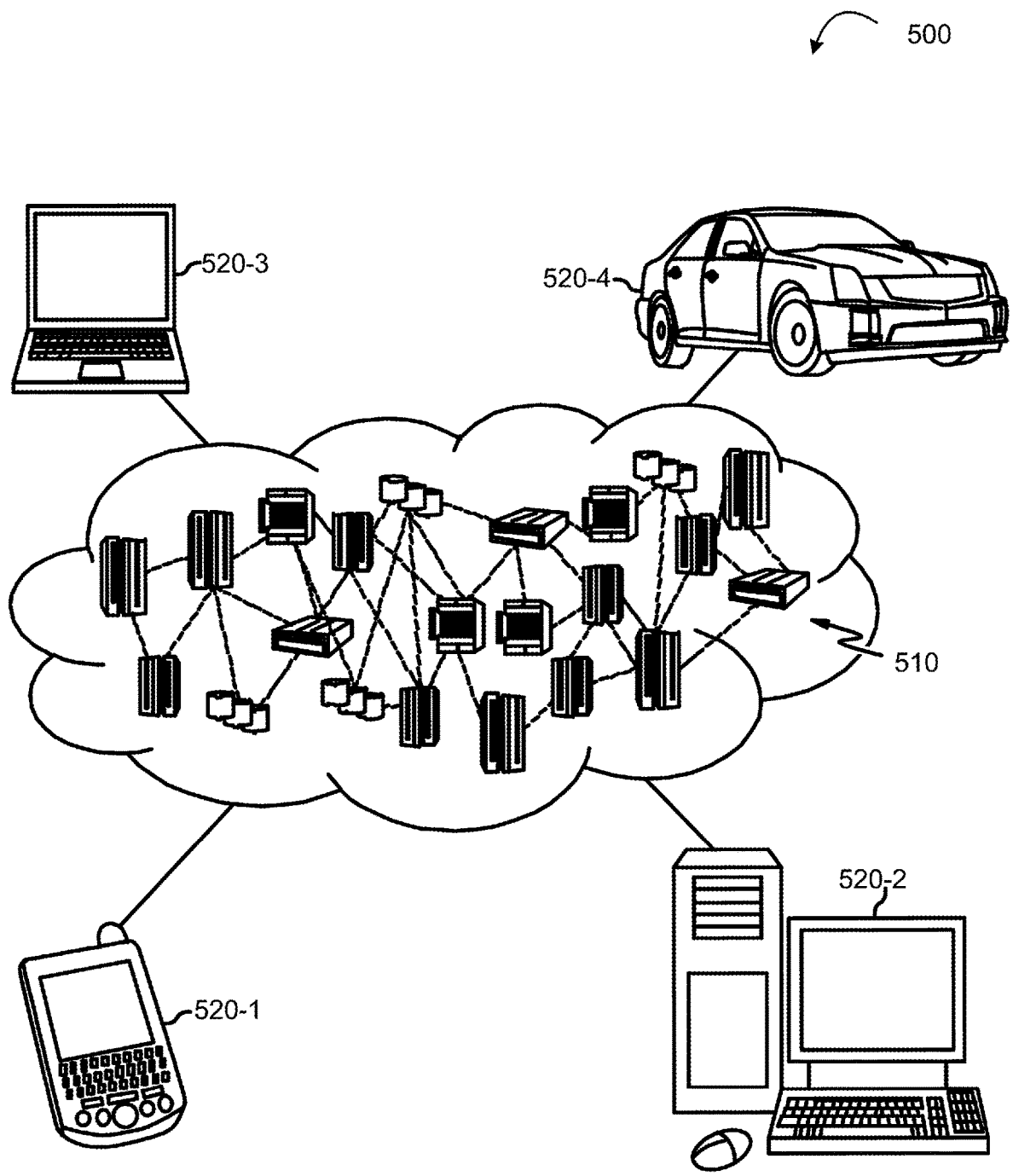
FIG. 5 depicts a cloud computing environment in accordance with embodiments of the present disclosure.

Referring now to FIG. 5, illustrative cloud computing environment 500 is depicted. As shown, cloud computing environment 500 includes one or more cloud computing nodes 510 with which local computing devices used by cloud consumers, such as, for example, personal digital assistant (P.D.A.) or cellular telephone 520-1, desktop computer 520-2, laptop computer 520-3, and/or automobile computer system 520-4 may communicate. Nodes 510 may communicate with one another. They may be grouped (not shown) physically or virtually, in one or more networks, such as Private, Community, Public, or Hybrid clouds as described hereinabove, or a combination thereof. This allows cloud computing environment 500 to offer infrastructure, platforms and/or software as services for which a cloud consumer does not need to maintain resources on a local computing device. It is understood that the types of computing devices 520-1 to 520-4 shown in FIG. 5 are intended to be illustrative only and that computing nodes 510 and cloud computing environment 500 can communicate with any type of computerized device over any type of network and/or network addressable connection (e.g., using a web browser).

Figure 6:
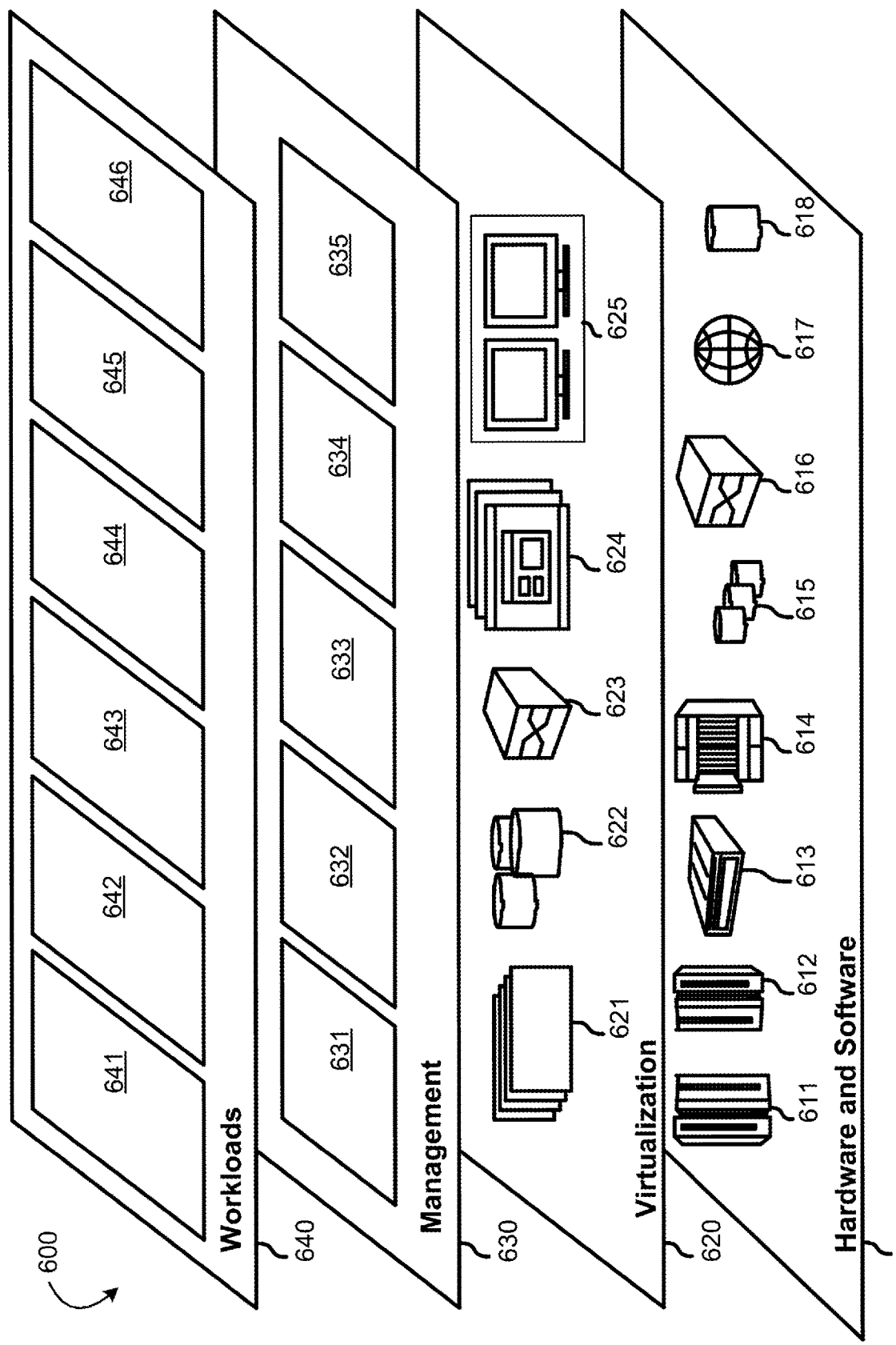
FIG. 6 depicts abstraction model layers in accordance with embodiments of the present disclosure.

Referring now to FIG. 6, a set of functional abstraction layers 600 provided by cloud computing environment 500 (FIG. 5) is shown. It should be understood in advance that the components, layers, and functions shown in FIG. 6 are intended to be illustrative only and embodiments of the disclosure are not limited thereto. As depicted, the following layers and corresponding functions are provided:

Hardware and software layer 610 includes hardware and software components. Examples of hardware components include mainframes 611; RISC (Reduced Instruction Set Computer) architecture-based servers 612; servers 613; blade servers 614; storage devices 615; and networks and networking components 616. In some embodiments, software components include network application server software 617 and database software 618.

Virtualization layer 620 provides an abstraction layer from which the following examples of virtual entities may be provided: virtual servers 621; virtual storage 622; virtual networks 623, including virtual private networks; virtual applications and operating systems 624; and virtual clients 625.

In one example, management layer 630 may provide the functions described below. Resource provisioning 631 provides dynamic procurement of computing resources and other resources that are utilized to perform tasks within the cloud computing environment. Metering and Pricing 632 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 633 provides access to the cloud computing environment for consumers and system administrators. Service level management 634 provides cloud computing resource allocation and management such that required service levels are met. Service Level Agreement (SLA) planning and fulfillment 635 provide pre-arrangement for, and procurement of, cloud computing resources for which a future requirement is anticipated in accordance with an SLA.

Workloads layer 640 provides examples of functionality for which the cloud computing environment may be utilized. Examples of workloads and functions which may be provided from this layer include mapping and navigation 641; software development and lifecycle management 642 (e.g., the SRR system 120); virtual classroom education delivery 643; data analytics processing 644; transaction processing 645; and an analysis system 646.

The present disclosure may be a system, a method, and/or a computer program product at any possible technical detail level of integration. The computer program product may include a computer-readable storage medium (or media) having computer readable program instructions thereon for causing a processor to carry out aspects of the present disclosure.

The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer-readable program instructions described herein can be downloaded to respective computing/processing devices from a computer-readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a standalone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the various embodiments. As used herein, the singular forms "a," "an," and "the" are intended to include the plural forms as well, unless the context clearly indicates otherwise. It will be further understood that the terms "includes" and/or "including," when used in this specification, specify the presence of the stated features, integers, steps, operations, elements, and/or components, but do not preclude the presence or addition of one or more other features, integers, steps, operations, elements, components, and/or groups thereof. In the previous detailed description of example embodiments of the various embodiments, reference was made to the accompanying drawings (where like numbers represent like elements), which form a part hereof, and in which is shown by way of illustration specific example embodiments in which the various embodiments may be practiced. These embodiments were described in sufficient detail to enable those skilled in the art to practice the embodiments, but other embodiments may be used and logical, mechanical, electrical, and other changes may be made without departing from the scope of the various embodiments. In the previous description, numerous specific details were set forth to provide a thorough understanding the various embodiments. But the various embodiments may be practiced without these specific details. In other instances, well-known circuits, structures, and techniques have not been shown in detail in order not to obscure embodiments.

When different reference numbers comprise a common number followed by differing letters (e.g., 100*a*, 100*b*, 100*c*) or punctuation followed by differing numbers (e.g., 100-1, 100-2, or 100.1, 100.2), use of the reference character only without the letter or following numbers (e.g., 100) may refer to the group of elements as a whole, any subset of the group, or an example specimen of the group.

It should first be appreciated that throughout this description the term "mechanism" is used to refer to elements of the present invention that perform various operations, functions, and the like. A "mechanism," as the term is used herein, may be an implementation of the functions or aspects of the illustrative embodiments in the form of an apparatus, a procedure, or a computer program product. In the case of a procedure, the procedure is implemented by one or more devices, apparatus, computers, data processing systems, or the like. In the case of a computer program product, the logic represented by computer code or instructions embodied in or on the computer program product is executed by one or more hardware devices in order to implement the functionality or perform the operations associated with the specific "mechanism." Thus, the mechanisms described herein may be implemented as specialized hardware, software executing on hardware to thereby configure the hardware to implement the specialized functionality of the present invention which the hardware would not otherwise be able to perform, software instructions stored on a medium such that the instructions are readily executable by hardware to thereby specifically configure the hardware to perform the recited functionality and specific computer operations described herein, a procedure or method for executing the functions, or a combination of any of the above.

Moreover, references to "models" or a "model" in the present description specifically refers to computer executed machine learning models. These models comprise algorithms, statistical models, and the like, that computer systems use to perform a specific task without using explicit instructions, but instead relying on patterns and inference instead. Machine learning algorithms build a computer executed model based on sample data, known as "training data", in order to make predictions or decisions without being explicitly programmed to perform the task. Examples of machine learning models include, but are not limited to, supervised machine learning models such as convolutional neural networks (CNNs), deep neural networks (DNNs), and the like, as well as unsupervised machine learning models such as Isolation Forest models, One-Class Support Vector Machine (SVM) models, Local Outlier Factor models, and the like, ensemble learning mechanisms such as Random Forest models, and the like.

Further, the phrase "at least one of," when used with a list of items, means different combinations of one or more of the listed items can be used, and only one of each item in the list may be needed. In other words, "at least one of" means any combination of items and number of items may be used from the list, but not all of the items in the list are required. The item can be a particular object, a thing, or a category.

For example, without limitation, "at least one of item A, item B, or item C" may include item A, item A and item B, or item B. This example also may include item A, item B, and item C or item B and item C. Of course, any combinations of these items can be present. In some illustrative examples, "at least one of" can be, for example, without limitation, two of item A; one of item B; and ten of item C; four of item B and seven of item C; or other suitable combinations.

Different instances of the word "embodiment" as used within this specification do not necessarily refer to the same embodiment, but they may. Any data and data structures illustrated or described herein are examples only, and in other embodiments, different amounts of data, types of data, fields, numbers and types of fields, field names, numbers and types of rows, records, entries, or organizations of data may be used. In addition, any data may be combined with logic, so that a separate data structure may not be necessary. The previous detailed description is, therefore, not to be taken in a limiting sense.

The descriptions of the various embodiments of the present disclosure have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Although the present disclosure has been described in terms of specific embodiments, it is anticipated that alterations and modification thereof will become apparent to the skilled in the art. Therefore, it is intended that the following claims be interpreted as covering all such alterations and modifications as fall within the true spirit and scope of the disclosure.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method of handling host requests on a hardware security module (HSM), the computer-implemented method comprising:
    selecting a domain with a longest wait time with a host request for the HSM;
    selecting an oldest host request requested by the domain;
    determining a hardware engine type in the HSM required to process the oldest host request;
    determining a saturation level of the hardware engine type exceeds a saturation threshold for the hardware engine type, wherein the saturation level indicates a usage of the hardware engine type;
    selecting a second host request requested by the domain that uses a different hardware engine type based on the saturation level exceeding the saturation threshold; and
    processing, by the HSM, the second host request using the different hardware engine type of the HSM.

2. The computer-implemented method of claim 1, wherein determining the saturation level of the hardware engine type exceeds the saturation level for the hardware engine type comprises:
    comparing an engine type count of the hardware engine type in a system in-use table with another engine type count of the hardware engine type in an engine threshold table;
    determining that processing the host request will exceed the saturation threshold based on the comparison;
    determining a skip count relating to the host request is not incremented; and
    incrementing the skip count relating to the host request.

3. The computer-implemented method of claim 1, wherein selecting the second host request requested by the domain comprises:
    determining a second hardware engine type in the HSM required to process the second host request; and
    determining a second saturation level of the second hardware engine type is below a second saturation threshold for the second hardware engine type.

4. The computer-implemented method of claim 1, wherein selecting the second host request requested by the domain comprises:
    determining a second hardware engine type in the HSM required to process the second host request;
    determining a second saturation level of the second hardware engine type exceeds a second saturation threshold for the second hardware engine type;
    comparing an engine type count of the second hardware engine type in a system in-use table with another engine type count of the second hardware engine type in an engine threshold table;
    determining that processing the host request will exceed the saturation threshold based on the comparison;
    determining a skip count relating to the host request is not incremented;
    incrementing the skip count relating to the host request; and
    determining no other host requests remain for the domain.

5. The computer-implemented method of claim 1 includes selecting another domain with the longest wait time having another host request for the HSM.

6. The computer-implemented method of claim 1, wherein the domain is related to a tenant producing host requests for the HSM.

7. The computer-implemented method of claim 1, wherein selecting the domain includes selecting the domain from an active domain list maintained by the HSM.

8. The computer implemented method of claim 1, further comprising:
 selecting the domain with the longest wait time with another host request to the HSM;
 determining a skip count of the domain is incremented; and
 processing, by the HSM, the oldest host request flagged by the skip count.

9. The method of claim 1, wherein the domain with the longest wait time refers to the domain at a head of an active domain linked list maintaining domains with unprocessed requests.

10. A computer program product comprising a computer readable storage medium having computer readable instructions stored therein, wherein the computer readable instructions for handling host requests on a hardware security module (HSM), when executed on a computing device, causes the computing device to:
 select a domain with a longest wait time with a host request for the HSM;
 select an oldest host request requested by the domain;
 determine a hardware engine type in the HSM required to process the oldest host request;
 determine a saturation level of the hardware engine type exceeds a saturation threshold for the hardware engine type, wherein the saturation level indicates a usage of the hardware engine type;
 select a second host request requested by the domain that uses a different hardware engine type based on the saturation level exceeding the saturation threshold; and
 process, by the HSM, the second host request using the different hardware engine type of the HSM.

11. The computer program product of claim 10, wherein the instructions to determine the saturation level of the hardware engine type exceeds the saturation level for the hardware engine type comprises instructions to:
 compare an engine type count of the hardware engine type in a system in-use table with another engine type count of the hardware engine type in an engine threshold table;
 determine that processing the host request will exceed the saturation threshold based on the comparison;
 determine a skip count relating to the host request is not incremented; and
 increment the skip count relating to the host request.

12. The computer program product of claim 10, wherein the instructions to select the second host request requested by the domain comprise instruction to:
 determine a second hardware engine type in the HSM required to process the second host request; and
 determine a second saturation level of the second hardware engine type is below a second saturation threshold for the second hardware engine type.

13. The computer program product of claim 10, wherein the instructions to select the second host request requested by the domain comprise instructions to:
 determine a second hardware engine type in the HSM required to process the second host request;
 determine a second saturation level of the second hardware engine type exceeds a second saturation threshold for the second hardware engine type;
 compare an engine type count of the second hardware engine type in a system in-use table with another engine type count of the second hardware engine type in an engine threshold table;
 determine that processing the host request will exceed the saturation threshold based on the comparison;
 determine a skip count relating to the host request is not incremented;
 increment the skip count relating to the host request; and
 determine no other host requests remain for the domain.

14. The computer program product of claim 10 includes instruction to selects another domain with the longest wait time having another host request for the HSM.

15. The computer program product of claim 10, wherein the domain is related to a tenant producing host requests for the HSM.

16. The computer program product of claim 10, wherein selecting the domain includes selecting the domain from an active domain list maintained by the HSM.

17. The computer program product of claim 10, further comprising instructions to:
 select the domain with the longest wait time with another host request to the HSM;
 determine a skip count of the domain is incremented; and
 process, by the HSM, the oldest host request flagged by the skip count for processing by the HSM.

18. The computer program product of claim 10, wherein the domain with the longest wait time refers to the domain at a head of an active domain linked list maintaining domains with unprocessed requests.

19. A system for handling host requests on a hardware security module (HSM), the system comprising:
 a memory;
 a processor;
 local data storage having stored thereon computer executable code, wherein the computer executable code includes program instruction executable by the processor to cause the processor to perform a method;
 a central processing unit (CPU) receiving buffer configured to store incoming host request blocks from tenants sending requests to the HSM;
 a set of domains configured to correspond to the tenants accessing the HSM;
 a system in-use engine table configured to store engine types in use by the HSM;
  a system engine threshold table configured to store engine types provided by the HSM and a number of engines for each of the engine types within the HSM, wherein the system engine threshold table is maintained for the HSM indicating a threshold for the engine types; and
 a selector, implemented with the processor and memory, configured to select the host request blocks based on their position in an active domain linked list and a saturation level of an engine type required to process the host request blocks.

20. The system of claim 19, further comprising:
a host request buffer configured to track host requests with the longest wait times is maintained for the HSM.

* * * * *